C. H. LITTLE.
DRAFTING MACHINE.
APPLICATION FILED DEC. 12, 1908.

1,208,340.

Patented Dec. 12, 1916.
4 SHEETS—SHEET 1.

Witnesses.
G. W. Tauberschmidt
E. M. Klatcher

Inventor.
Charles H. Little,
By Gillson & Gillson
Attys

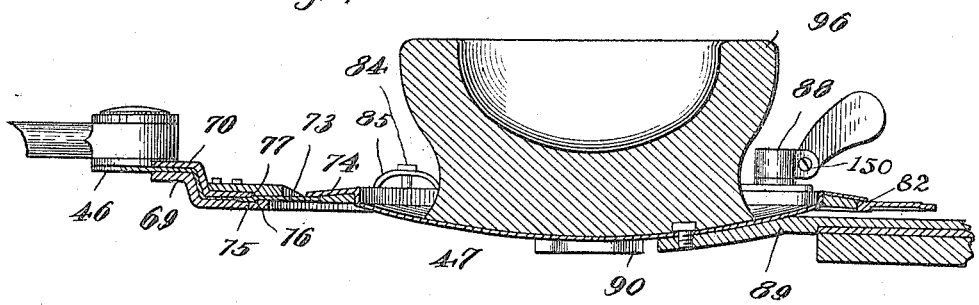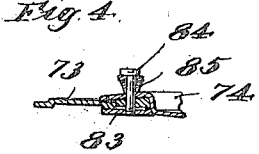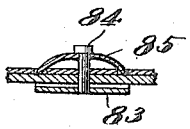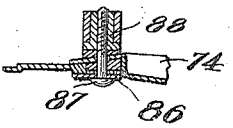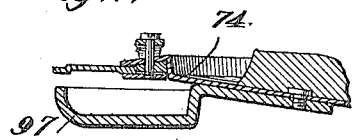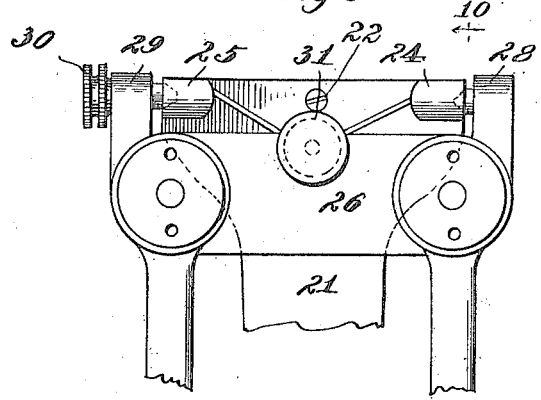

C. H. LITTLE.
DRAFTING MACHINE.
APPLICATION FILED DEC. 12, 1908.
1,208,340.
Patented Dec. 12, 1916.
4 SHEETS—SHEET 3.
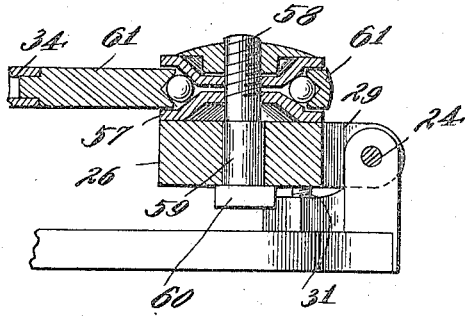
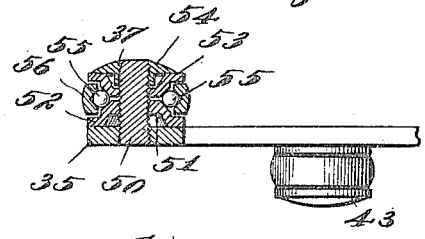
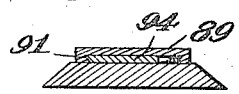
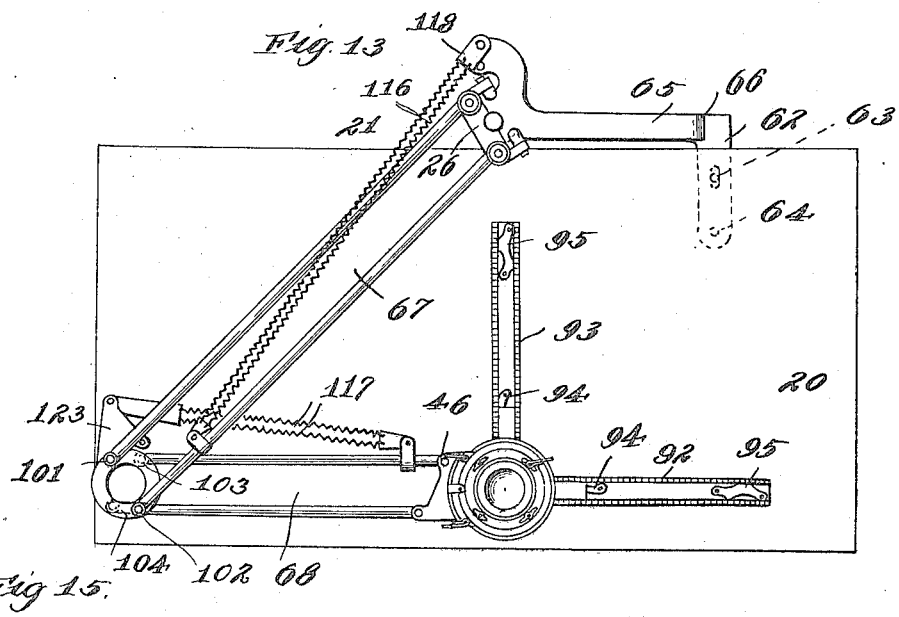
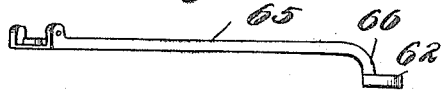
Witnesses:
Inventor:
Charles H Little,
By
Attys

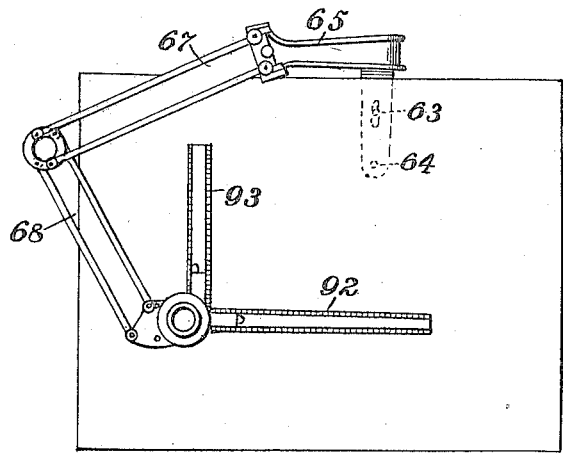
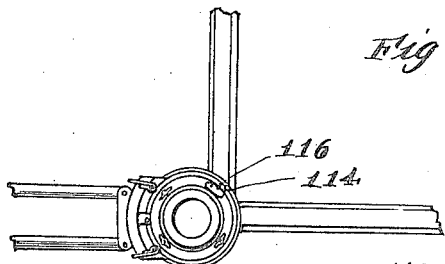
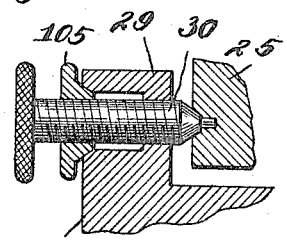
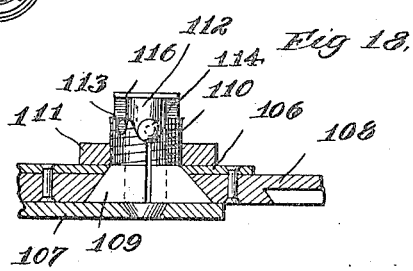
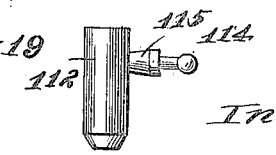

UNITED STATES PATENT OFFICE.

CHARLES H. LITTLE, OF CLEVELAND, OHIO.

DRAFTING-MACHINE.

1,208,340. Specification of Letters Patent. Patented Dec. 12, 1916.

Application filed December 12, 1908. Serial No. 467,284.

*To all whom it may concern:*

Be it known that I, CHARLES H. LITTLE, a citizen of the United States, and resident of Cleveland, county of Cuyahoga, State of Ohio, have invented certain new and useful Improvements in Drafting - Machines, of which the following is a specification and which are illustrated in the accompanying drawings, forming a part thereof.

The invention relates to machines for use on a drawing board, and which comprise a jointed arm for carrying the drafting instrument, usually a protractor, certain features of the invention, however, relating to the protractor whether used in connection with such jointed arm or otherwise.

The object of the invention is to improve machines of this character in various features, as hereinafter pointed out, with view to securing greater accuracy and a wider range of efficiency; the invention being exemplified in the structure and parts thereof as hereinafter described, and as illustrated in the accompanying drawings, in which—

Figure 1:
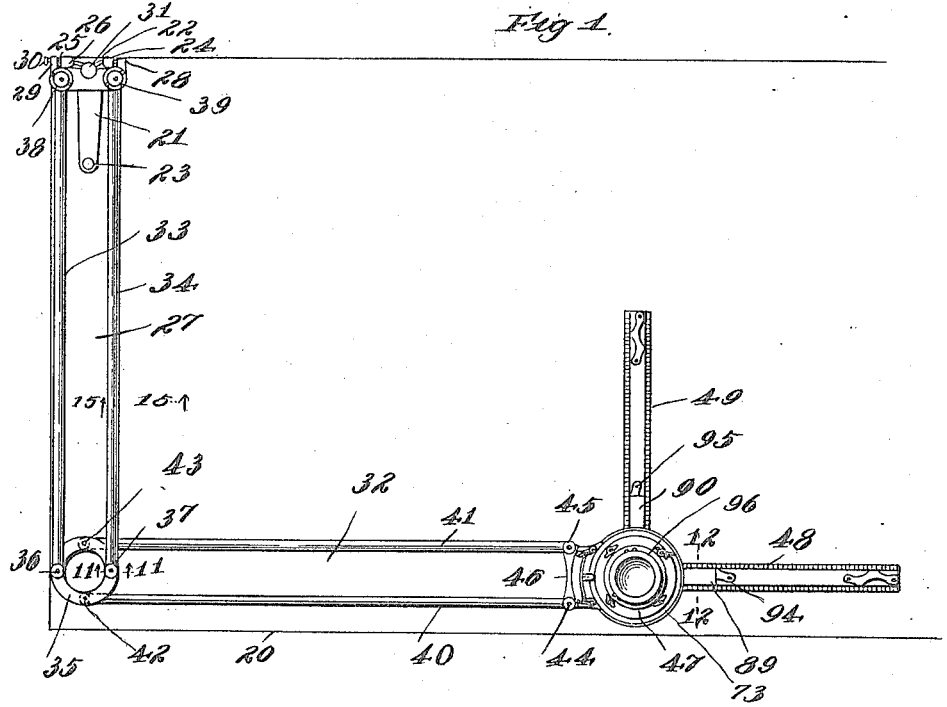
Figure 2:
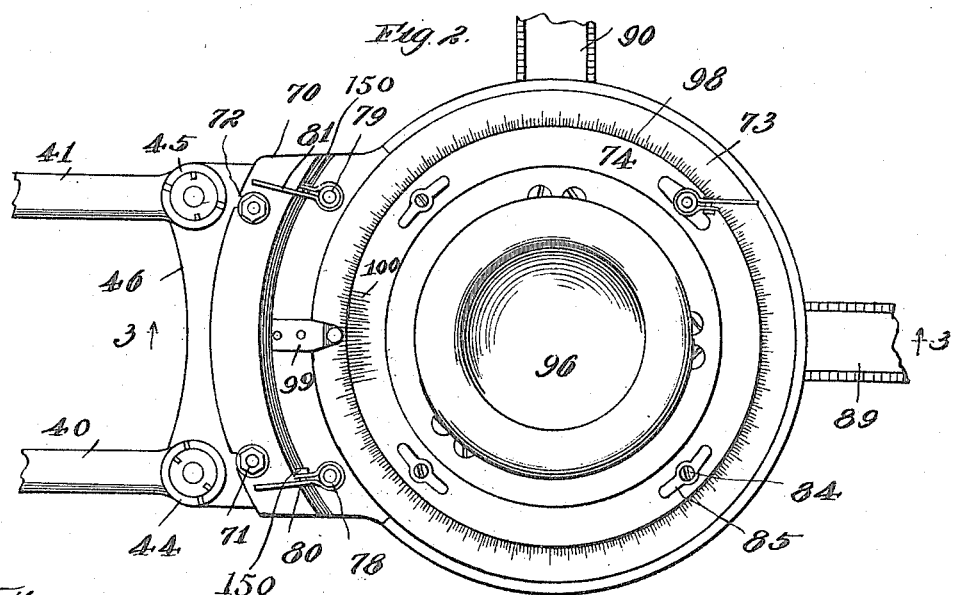

Figure 1 is a plan view of one form of the machine as applied to a drawing board; Fig. 2 is a detail plan view showing parts of the protractor included in Fig. 1 but drawn to a larger scale; Fig. 3 is a sectional view on the line 3—3 of Fig. 2; Figs. 4, 5, 6, and 7 are sectional details of the protractor; Fig. 8 is a detail showing a modified form of pivot for attaching the jointed arm to the anchor; Fig. 9 is a detail plan view of the inner end of the jointed arm and the anchor block to which the same is attached; Fig. 10 is a detail section on the line 10—10 of Fig. 9; Fig. 11 is a sectional detail on the line 11—11 of Fig. 1; Fig. 12 is a sectional detail on the line 12—12 of Fig. 1; Fig. 13 is a plan view of a modified form of the machine as applied to a drawing board; Fig. 14 is a detail of the anchor block shown in Fig. 13; Fig. 15 is a sectional view on the line 15—15 of Fig. 1; Fig. 16 is a diagram representing the maximum range of movement of the machine as illustrated in Fig. 13 in drawing a rectangular figure; Fig. 17 is a detail showing the outer end of the jointed arm and the drawing instrument carried thereby, the protractor being provided with a special form of lock; Fig. 18 is a sectional detail of the protractor shown in Fig. 17, and illustrating the special form of lock; Fig. 19 is a detail of the locking bolt shown in Fig. 18.

A drawing board of ordinary form is shown at 20. The drafting machine is secured to this board, in one form of construction, by an anchor plate 21, attached to the board at its upper left-hand corner, the base of the plate extending transversely of the grain of the board. As boards are ordinarily made, the grain is parallel with their upper and lower edges, and hence the base of the anchor plate extends along the side edge of the board and is fixed to the board by means of screws 22, 23, arranged along such side edge.

The instrument forming the subject of this specification is intended to produce drawings with extreme accuracy. It has been found that in such instruments the distortion of the board, resulting from its absorption of moisture, produces variations in the angular position of the drawing tools carried at the outer end of the jointed arm. The moisture enters most freely at the ends of the board, the pores of the wood running with the grain, and in damp weather the swelling of the wood results in a widening of the board adjacent its ends, so that the lines of the grain adjacent the upper and lower edges of the board become bowed outwardly toward their ends. As these instruments have heretofore been made, the attachment to the board has been by securing means arranged parallel with the upper edge of the board, that is to say, on substantially a horizontal line. The distortion referred to has had the effect of so shifting this line that it becomes oblique.

By the arrangement of the securing means by which the anchor plate is attached to the board transversely to the grain thereof, the distortion of the latter does not affect the position of the plate; consequently it does not vary the angular position of the instrument carried at the outer end of the machine.

The anchor plate 21 is provided with a pair of upstanding lugs 24, 25, to which there is pivotally attached a plate 26, which constitutes the inner end of the inner arm-member 27 of the machine. The plate 26 has rearwardly-projecting lugs which are engaged with the lugs 24, 25, one of them, as 28, carrying a pivot, preferably integral with the lug, for engaging a socket in the lug 24, and the other, 29, carrying a screw 30, the inner end of which engages as a pivot a socket in the lug 25. The downward movement of the plate 26 is limited by a set-screw 31 set through the plate, the lower end thereof bearing on the anchor plate 21. Preferably at least one of the pivots for securing the plate 26 to the anchor takes the form shown in Fig. 8, the aperture in the lug 29 for receiving the pivot screw 30 being counterbored at its outer end, and a lock-nut 105 being applied to the screw and having its inner face tapered to enter the counterbore, thereby providing a positive lock for the screw against lateral movement.

The machine comprises a pair of arm-members 27, 32, pivotally united, and each having the form of a parallelogram. The inner arm-member 27 comprises the parallel bars 33, 34, pivoted at their inner ends to the plate 26 and at their outer ends to a member 35, here shown as annular in form and constituting one side of the parallelogram, the pivots 36, 37, uniting it with the bars 33, 34, being arranged on a line parallel with the line of the pivots 38, 39, uniting these bars with the plate 26. The outer arm member 32 comprises the parallel bars 40, 41, pivoted at 42, 43, to the member 35, the line of these pivots being transverse to the line of the pivots 36, 37. The outer ends of the bars 40, 41, are pivoted at 44, 45, to a plate 46, the line of the latter pivots being parallel with the line of the pivots 42, 43. To the plate 46 there is attached a drafting instrument, here shown as a protractor 47, carrying the rulers 48, 49, which are in perpendicular relation to each other.

The general description of the drafting machine thus far given, except as to the manner of attaching the anchor plate 21 to the board, is the same as the machine forming the subject of my pending application for patent filed September 11th, 1901, Serial No. 75,004.

In machines of this character it has been found exceedingly difficult to provide pivots for the jointed arms which, while being free from play, other than the true pivotal action, permit the necessary freedom and ease of movement. Indeed, heretofore there has always been present either sufficient play to prevent accuracy on the drafting board, or the friction has produced a drag or distortion of the machine with a similar result, and which has rendered it impossible to quickly move the instrument to a definite position. In the present machine the various pivots of the jointed arm take the form of ball bearings, as illustrated in detail in Figs. 10 and 11, and these bearings differ from ball bearings heretofore employed in mechanics, in form and function, in that the balls are firmly clamped in the raceways and the bearings are called upon to carry an overhanging load, the strains of which are transverse to the axis of rotation.

In Fig. 11 there is illustrated the ball bearing joints connecting the two members of the jointed arm and also the form used at the outer end of the outer member 32. Referring to the portion of Fig. 11 shown in cross-section, and representing the joint 37, it will be seen that there is a post 50, fixed in the member 35 and threaded to receive various elements of the joint. These elements comprise a centering block 51 in the form of a truncated cone, and which is first applied to the post 50 and turned down tightly upon the face of the member 35; and a plate 52, which forms one of the cones of the ball bearing and is next applied to the post, its lower face being recessed to fit upon the centering block 51. By this construction greater accuracy is secured than is possible when dependence is placed upon the threaded engagement of the cone with the post for centering the former. The outer cone 53 is also in threaded engagement with the post 50, and a lock nut 54 bears upon its upper face and holds it against displacement.

The balls 55 are seated upon the faces of the cones 52, 53, and within a V-shaped channel formed in the head 56 of the bar 34. In assembling the parts, the cone 52 having been properly seated the head 56 is applied, the balls inserted, and the cone 53 is then turned down upon the post 50 until the balls are firmly gripped by the several members, the engagement being sufficiently tight to hold the arm members against movement transverse to the axis of the pivot.

The joints 36, 42, 43, 44 and 45 are identical in construction with the joint 37, which has been described in detail. The joints 38, 39, one of which is illustrated in detail in Fig. 10, differ from the joint already described only in that the inner cone 57 is preferably a forced fit upon the post instead of being in threaded engagement therewith, and one or both of these joints is provided with a post the outer end, 58, of which is eccentric to the body portion 59, which is set tightly through the plate 26 but may be turned by the application of a wrench to its polygonal head 60, for the purpose of accurately positioning the several members of the arm 27. In adjusting these joints, also, the outer cone is set down tightly upon the balls in order that all play other than the pivotal action may be entirely eliminated.

The body portions of the bars 33, 34, 40 and 41 are tubular, and are flattened, as shown in Fig. 15, their major diameters being in the planes of movement about the ball bearing joints, thereby providing for flexure in a direction perpendicular to these planes. Their ends or heads, as 56, 61, are solid and are welded to the body portions. By reason of this construction and the location of the ball races within the heads of the bars, the strains are transmitted directly in line with the latter.

In Figs. 13 and 14 there is shown a modified form of anchor. Instead of the simple block 21 located in the upper left-hand corner of the board, there is employed a base block 62, shown as secured to the under side of the board 20, and adjacent its upper right-hand corner by means of screws 63, 64, arranged transversely of the grain of the board, as in the other form of construction, one of the screw-holes preferably being elongated to permit slight movement due to the expansion and contraction of the board. From this block 62 an arm 65 projects along the upper edge of the board, as shown to a point somewhat beyond the middle thereof, this arm being offset upwardly, as shown at 66, to provide clearance for the drafting instruments when it is desired to use them over the upper right-hand portion of the board. In this instance also the pivots securing the member 26 of the jointed arm to the anchor are arranged on a line oblique to the edges of the board, and the two members 67, 68, of the jointed arm are of unequal length, the outer arm 68 being the shorter. By this arrangement and proportioning of the parts the drafting instruments carried by the jointed arm may be moved over substantially the entire surface of the board without extending materially beyond its side edge, thereby effecting an economy of room space in that it is usually more convenient to locate the drawing board to give clearance above it instead of at its side.

The rectangular field covered by the drafting instrument, as illustrated in Fig. 16, is much larger than has heretofore been within the range of machines of this type, while the clearance required to the left of this field is limited to the distance from the outer end of the jointed arm to the zero mark of the scale of the straight edges carried thereby. The clearance for the machine is almost wholly above the field of operation, a consideration of great importance in drafting rooms.

The protractor 47 is of novel construction and is illustrated in detail in Figs. 2 to 7. It is secured to the outer cross-member 46 of the arm 32 or 68 by means of a pair of clamping plates 69, 70, between which the member 46 is received, the three members being firmly secured together by means of screw-bolts 71, 72. The protractor comprises an annular scaled plate 73 and a circular center plate 74 fitted therein. The annular plate 73 fits between the plates 69, 70, and has formed on its lower face adjacent its outer edge a shoulder 75, engaging a complementary shoulder 76 formed on the upper face of the plate 69. A shoulder 77, formed on the upper face of the plate 73 adjacent its outer edge, engages the edge of the plate 70. This construction, while providing for the secure mounting of the plate 73, permits its rotation between the plates 69 and 70. A pair of studs 78, 79, set in the plate 69, project upwardly through the plate 70, and carry at their upper ends wing nuts 80, 81, by means of which the two plates may be drawn together for the purpose of firmly clamping the plate 73 to lock it in the position to which it may be adjusted. The wing nuts 80 and 81 are of special construction, as shown in Figs. 2, 3 and 6, the last two figures showing the application of a similar nut in a different part of the device. These nuts comprise a body portion to which the numeral 88 in Fig. 6 is tied by a lead line and a strap, to which the numerals 80 and 81 are applied in Fig. 2, this strap being looped around the body and adjustably clamped thereto by means of a screw 150, as shown in Figs. 2 and 3.

The center plate 74 of the protractor is in rotatable engagement with the plate 73, being seated in an annular rabbet 82, formed in the upper face of the latter adjacent its inner edge. The two plates are held against disengagement by an annularly arranged series of clips 83 applied to the under face of the plate 74, and projecting beyond the inner edge of the plate 73, these clips, except one of them, being secured by means of screws 84 setting through the plate 74 from above, their heads bearing upon spring washers 85. One of the clips, designated 86, carries a stud 87 which projects upwardly through the plate 74 and carries at its upper end a wing nut 88, by means of which the plates 73, 74, may be locked together.

A pair of chuck plates 89, 90, are rigidly secured to the under face of the plate 74, one perpendicular to the other. Each of these plates is formed with a longitudinal recess opening through its outer end and having its side walls undercut, as shown at 91, Fig. 12. Rulers 92, 93, are fitted to these chuck plates, each carrying chuck-engaging plates 94, 95, one adjacent each end, complementary to the chucking recesses. A knob 96 is firmly secured to the upper face of the plate 74, and serves as means for controlling the instrument. A foot 97 is secured to the lower face of the plate 74, and has its sole rounded that it may freely slide over the surface of the drawing paper.

The plate 73 has an annular graduated scale 98 marked upon its upper face, adjacent its inner edge, and registering 360 degrees. A reference point 99 is fixed to the plate 70 and coöperates with the scale 98. A vernier 100 is marked on the plate 74 and also coöperates with the scale 98.

The protractor here shown and described is of special value in connection with surveyor's work, providing for plotting without computations, the operator's field notes being required only to record angles and measurements, the drafting instrument enabling him to transfer his work to paper by merely setting the scales of the instrument to record the angles determined by his transit. It will be understood that the drafting machine may be equipped with any other style of protractor, or other drafting tool.

The jointed arm is adjustably supported above the board by the screw 31, resting upon the anchor block, and the bars are capable of sufficient flexure transverse to the plane in which they swing to permit the user to hold the drafting instrument firmly to the board, but are sufficiently elastic to immediately raise it therefrom when the downward pressure is released. The joints of the arm move pivotally with such freedom that the element of friction is substantially eliminated and the consequent drag, which in instruments of this character results in some slight angular deviation of the straight edges, is entirely avoided. The joints being set up tight, entirely eliminate lost motion and insure greater accuracy than it has been possible to obtain by any other form of pivot. In instruments of this character it has heretofore been proposed to unite the two parallelograms forming the jointed arm by pivots common to each, and it has also been proposed to arrange the pivots of the two parallelograms on lines perpendicular to each other. As illustrated in Fig. 13, these pivots, there designated by the numerals 101, 102, and 103, 104, the one pair belonging to the arm 67 and the other pair to the arm 68, are arranged upon lines which are oblique to each other. This disposition of the pivots provides for a free range of movement of the drafting instrument over the board, while reducing the movement required of the inner member of the jointed arm, thereby still farther economizing the space required beyond the edge of the board.

In Figs. 17, 18 and 19 there is shown in detail a form of stop which may be used in connection with the protractor. Referring to Fig. 18, the upper plate of the protractor is represented at 106 and its lower plate at 107. At 108 is shown a chuck-arm for carrying one of the rulers, this chuck-arm being carried by the plate 106. A conical bushing 109 is seated within an aperture of complementary form in the members 106, 108. This bushing has an upwardly-projecting threaded stem 110, and is centrally apertured and longitudinally split. A nut 111, running upon the stem 110, bears against the upper face of the plate 106 and draws the conical portion of the bushing firmly to its seat, the split in the bushing facilitating its seating by permitting its compression. A post 112 extends through the longitudinal aperture of the bushing and enters a suitable socket in the plate 107.

The stem 110 is recessed at its outer end, this recess preferably having flaring walls and one of such walls being provided with a notch 113. An arm 114 projects laterally from the post 112 and coöperates with the recess in the outer end of the stem 110. This arm preferably carries an anti-friction roller 115 for engaging the walls of the recess. A spring 116, secured to the plate 106 bears upon the upper end of the post 112 to force it into engagement with the socket in the plate 107. The post is raised against the pressure of the spring 116 by lateral pressure upon the arm 114, causing it to ride up one of the walls of the recess in the stem 110, and may be held in its upper position by engaging the arm with the notch 113.

In machines of this type when used on so-called vertical boards a counterpoise is necessary. In Fig. 13 such a device is shown, and comprises helical springs 116 reacting between the anchor plate 65 and the member 67, and springs 117 reacting between the member 67 and the outer end of the outer member of the jointed arm. To avoid the falling of the instrument should one of the springs break, there is provided a plurality of springs in each instance. The set of springs 117 is also attached to crossbars which in turn are secured to the members 101 and 68, and in order to keep the line of strain outside of the parallelogram the attachment to the member 101 is through the medium of an arm 123 projecting from such member.

I claim as my invention—

1. In a drafting machine, a jointed arm, the connection between the sections of the arm comprising ball bearings, the shells of such bearings securely clamping the balls thereof against lost motion.

2. In a drafting machine, in combination, an anchor plate, an arm swingingly mounted upon the plate, the connection between the arm and the plate comprising ball bearings, the shell of such bearings securely clamping the balls thereof against lost motion.

3. In a drafting machine, in combination, an anchor plate having a hinged leaf, an arm swingingly attached to and overhanging the leaf of the plate, the connection between the arm and the leaf comprising ball bearings, the shell of such bearings securely clamping the balls thereof against lost motion.

4. In a drafting machine, in combination, an anchor plate, a post fixed in the plate, a pair of circular plates mounted on the post and having their marginal portions inclined away each from the other, an arm having an eye the wall of which is circumferentially channeled and which encircles the post, such arm being located between the circular plates, and balls seated between the marginal portions of the circular plates and within the channel of the wall of the eye of the arm, the circular plates being securely clamped upon the balls to prevent lost motion.

5. In a drafting machine, in combination, a jointed arm comprising two members, one thereof having an eye the wall of which is formed with an annular channel, a post fixed in the other member of the arm and projecting through the eye, a conical centering block on the post, a cone fitted to the post and having a recess for engaging the centering block, a second cone mounted on the post, and a set of balls fitted in the channel and engaging the cones.

6. In a drafting machine, in combination, a jointed arm comprising two members, one thereof having an eye the wall of which is formed with an annular channel, a post fixed in the other member of the arm and projecting through the eye, a centering block on the post, a cone fitted to the post and having a recess for engaging the centering block, a second cone mounted on the post, and a set of balls fitted within the channel and engaging the cones, the cones engaging the balls to prevent all movement except rotation thereof.

7. In a drafting machine, in combination, a jointed arm comprising two members, one thereof having an eye, the wall of which is formed with an annular channel, a post in the other member of the arm and projecting through the eye, a centering block on the post, a cone in threaded engagement with the post and having a recess for engaging the centering block, a second cone mounted on the post, and a set of balls fitted within the channel and engaging the cones.

8. In a drafting machine, in combination, an anchored plate, a leaf pivoted to the plate, a pair of parallel bars pivoted to and overhanging the leaf, a cross member pivotally attached to the outer ends of the bars, a second pair of parallel bars pivotally attached to the cross member, a second cross member pivotally attached to the outer ends of the second pair of bars, all of the pivots of the two sets of bars having ball bearings, the balls thereof being securely clamped against lost motion, and a drafting instrument carried by the second-named cross member.

9. In a drafting machine, in combination, an anchored plate, a leaf pivoted to the plate, a pair of parallel bars pivoted to and overhanging the leaf, a cross member pivotally attached to the outer ends of the bars, a second pair of parallel bars pivotally attached to the cross member, a second cross member pivotally attached to the outer ends of the second pair of bars, all of the pivots of the two sets of bars having ball bearings, means for limiting the movement of the balls to rotation, and a drafting instrument carried by the second-named cross member.

10. In a drafting machine, in combination, a drafting board, an anchor block secured to the board remote from one end thereof and having an arm extending along one edge of the board and being offset above the surface thereof, a jointed arm pivotally attached to the end of the arm of the anchor block, and a drafting instrument carried at the outer end of the jointed arm.

11. In a drafting machine, in combination, an anchor plate, a jointed arm pivoted on the plate, and a protractor carried at the outer end of the arm and comprising a base plate, a scaled rotatable annular plate mounted on the base plate, an independently rotatable circular plate fitting within the annular plate, and a ruler fixed to the circular plate.

12. In a drafting machine, in combination, an anchor plate, a jointed arm pivoted on the plate, and a protractor carried at the outer end of the arm and comprising a base plate, a scaled rotatable annular plate mounted on the base plate, an independently rotatable circular plate fitting within the annular plate, means for locking the annular plate to the base plate, means for locking the two movable plates together, and a ruler fixed to the circular plate.

13. In a drafting machine, in combination, a base, a scaled annulus mounted on the base and oscillatable about its own axis, an oscillatable circular plate fitted within the aperture of the annulus and carrying a vernier coöperating with the scale of the annulus, and a ruler carried by the circular plate.

14. In a drafting machine, in combination, a base, a scaled annulus oscillatably mounted on the base and oscillatable about its own axis, an oscillatable circular plate fitted within the aperture of the annulus and carrying a vernier coöperating with the scale of the annulus, a ruler carried by the circular plate, means for locking the annulus to the base, and means for locking the circular plate to the annulus.

15. In a drafting machine, in combination, a base, a scaled annulus oscillatably mounted on the base and oscillatable about its own axis, an oscillatable circular plate fitted within the aperture of the annulus and carrying a vernier coöperating with the scale of the annulus, a ruler carried by the circular plate, and means for locking the annulus to the base comprising a post, a nut in threaded engagement with the post, and a controlling wing adjustably fixed to the nut.

16. In a drafting machine, in combination, a base, a scaled annulus oscillatably mounted on the base, an oscillatable circular plate fitted within the aperture of the annulus and carrying a vernier coöperating with the scale of the annulus, a ruler carried by the circular plate, and means for locking the annulus to the base comprising a post, a nut in threaded engagement with the post, and a controlling wing folded around the nut, and a screw securing the two ends of the wing together and binding its fold to the nut.

17. In a drafting instrument, in combination, scaled members in sliding engagement, a clamping device for locking such members together and comprising a threaded post, a nut engaging the post, and a controlling wing folded around the nut, and a screw securing the two ends of the wing together and clamping its fold to the nut.

18. In a drafting machine, in combination, an anchor plate, a jointed arm carried by the anchor plate and comprising two sections of unequal length, and a drafting instrument carried at the outer end of the arm.

19. In a drafting machine, in combination, a board, an anchor arm secured to the board below and extending above the drawing surface, a jointed arm comprising two sections and an elbow member, each section comprising a pair of parallel bars of equal length, the bars of the inner section being pivotally secured to the anchor arm, a drafting instrument carried at the outer end of the jointed arm, the anchor arm being located remote from the ends of the board and the lines joining the axes of the pivots connecting the bars of the inner section of the arm to the anchor arm being oblique to the edges of the board and the alinement of the pivots of adjacent ends of the sections of the jointed arm intersecting each other obliquely.

20. In a drafting machine, in combination, a board, an anchor arm secured to the board below and extending above the drawing surface, a jointed arm comprising two sections, each section comprising a pair of parallel bars of equal length, the bars of the inner section of the arm being pivotally sesured to the anchor arm, a drafting instrument carried at the outer end of the jointed arm, the anchor arm being located remote from the ends of the board, and the line joining the axes of the pivots connecting the bars of the inner section of the arm to the anchor arm being oblique to the edges of the board, and the lines joining the axes of the pivots of adjacent ends of the two sections of the arm being relatively transverse, the inner section of the jointed arm being longer than the outer section.

21. In a drafting instrument, in combination, a board, an anchor arm secured to the board below and extending above the drawing surface, a jointed arm comprising two sections, each section comprising a pair of parallel bars of equal length, the bars of the inner section of the arm being pivotally secured to the anchor arm, a drafting instrument carried at the outer end of the jointed arm, the anchor arm being located remote from the ends of the board, and the lines joining the axes of the pivots connecting the bars of the inner section of the arm to the anchor arm being oblique to the edges of the board, and the lines joining the axes of the pivots of adjacent ends of the two sections of the arm being relatively oblique, the inner section of the jointed arm being longer than the outer section.

22. In a drafting machine, in combination, an anchor, an arm, pivots connecting the arm to the anchor, one of the pivots comprising a screw-bolt in threaded engagement with one of the united members, the outer end of the bolt-receiving aperture being counterbored, and a tapering lock nut running on the bolt and fitting within the counterbore.

23. In a drafting machine, in combination, a board, an anchor comprising a base adapted for attachment to the board and an upstanding and laterally projecting arm, a jointed arm pivotally secured to the arm of the anchor, and a straight edge carried by the arm and movable under the arm of the anchor.

24. In a protractor, in combination, three plates having concentric curved edges of different radii, the outer plate being non-rotatable and carrying a reference point, the intermediate plate being annular and the intermediate and inner plates being independently rotatable and one thereof being graduated.

CHARLES H. LITTLE.

Witnesses:
J. GOLDBERGER,
E. B. SLAUSON.